US012598673B2

(12) United States Patent
Berg et al.

(10) Patent No.: US 12,598,673 B2
(45) Date of Patent: Apr. 7, 2026

(54) COMMUNICATION DEVICE COMPRISING MOBILE TERMINATION DEVICE AND RADIO BASE STATION

(71) Applicant: Telefonaktiebolaget LM Ericsson (publ), Stockholm (SE)

(72) Inventors: Miguel Berg, Sollentuna (SE); Elmar Trojer, Täby (SE); Michael Petras, Ottawa (CA); Roland Smith, Nepean (CA); Per-Erik Eriksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 650 days.

(21) Appl. No.: 17/598,689

(22) PCT Filed: Mar. 27, 2019

(86) PCT No.: PCT/SE2019/050275
§ 371 (c)(1),
(2) Date: Sep. 27, 2021

(87) PCT Pub. No.: WO2020/197453
PCT Pub. Date: Oct. 1, 2020

(65) Prior Publication Data
US 2022/0159787 A1 May 19, 2022

(51) Int. Cl.
*H04B 7/00* (2006.01)
*H04W 92/04* (2009.01)

(52) U.S. Cl.
CPC .................................. *H04W 92/045* (2013.01)

(58) Field of Classification Search
CPC ... H04W 92/045; H04W 84/18; H04W 76/02; H04W 28/04; H04W 24/00; H04L 29/06
(Continued)

(56) References Cited

U.S. PATENT DOCUMENTS

2013/0163524 A1 6/2013 Shatzkamer et al.
2016/0345192 A1 11/2016 Garg et al.
(Continued)

FOREIGN PATENT DOCUMENTS

WO 2017004255 A1 1/2017

OTHER PUBLICATIONS

Examination Report for European Patent Application No. 19719962.3, mailed Mar. 18, 2024, 6 pages.
(Continued)

*Primary Examiner* — Temica M Beamer
(74) *Attorney, Agent, or Firm* — Withrow & Terranova, PLLC

(57) ABSTRACT

It is provided a communication device comprising: a first wired connection interface for communicating backhaul signals with more central equipment over wired connection; a mobile termination device configured to transmit and receive the backhaul signals, wherein the backhaul signals conform to a cellular mobile communication standard; a radio base station, connected to the mobile termination device, wherein the radio base station is configured to transmit and receive access signals, conforming to a cellular mobile communication standard, to and from at least one local device, the access signals containing same payload data as corresponding backhaul signals; and at least one antenna port for communicating the access signals over the air.

20 Claims, 3 Drawing Sheets

1

70
Backhaul communicator

72
Access communicator

71
Converter

(58) Field of Classification Search
USPC ......................................................... 370/310
See application file for complete search history.

(56)                         References Cited

U.S. PATENT DOCUMENTS

| | | | | |
|---|---|---|---|---|
| 2017/0238189 | A1* | 8/2017 | Nolan ................... | H04W 16/14 |
| | | | | 370/328 |
| 2018/0076839 | A1* | 3/2018 | Baghel ................ | H04W 52/283 |
| 2020/0045563 | A1* | 2/2020 | Luo ....................... | H04W 48/18 |
| 2020/0052775 | A1* | 2/2020 | Nam ......................... | H04L 5/14 |
| 2020/0137614 | A1* | 4/2020 | Hampel ................ | H04W 76/11 |

OTHER PUBLICATIONS

Author Unknown, "Technical Specification Group Radio Access Network; Network Assistance for Network Synchronization (Release 14)," Technical Report 36.898, Version 14.0.0, 3GPP Organizational Partners, Jan. 2017, 25 pages.

Author Unknown, "Technical Specification Group Radio Access Network; Study on Integrated Access and Backhaul; (Release 15)," Technical Report 38.874, Version 0.7.0, 3GPP Organizational Partners, Nov. 2018, 111 pages.

International Search Report and Written Opinion for International Patent Application No. PCT/SE2019/050275, mailed Jun. 3, 2019, 10 pages.

* cited by examiner

COMMUNICATION DEVICE COMPRISING MOBILE TERMINATION DEVICE AND RADIO BASE STATION

This application is a 35 U.S.C. § 371 national phase filing of International Application No. PCT/SE2019/050275, filed Mar. 27, 2019, the disclosure of which is incorporated herein by reference in its entirety.

TECHNICAL FIELD

The present disclosure relates to the field of communication and in particular to a communication device comprising a mobile termination device for backhaul signals over a wired connection and a radio base station for access signals over the air.

BACKGROUND

Cable TV companies today provide broadband access services using DOCSIS (Data Over Cable Service Interface Specification) over a hybrid fibre-coax (HFC) infrastructure. Typically, around 500 homes are passed per fibre node (hub) with no more than ten cascaded amplifiers per strand. With DOCSIS 3.1, which is capable of delivering 10 Gbit/s in the downlink and 1 Gbit/s in the uplink, such a system provides around a full load CIR (Committed Information Rate) rate of 20 Mbit/s in downlink and 2 Mbit/s in uplink for 500 homes. To increase capacity, DOCSIS needs to be improved to support higher rates, which is technically challenging, or the number of homes passed per fibre node has to be reduced.

Different options on increasing capacity have been discussed in CABLELABS (the DOCSIS standardization body). Some amplifiers could be replaced with hubs, whereby the number of passed homes can be reduced from 500 to e.g. 100, which would increase the rates fivefold to 100 Mbit/s in downlink and 10 Mbit/s in uplink. However, increased number of hubs requires more fibre to be laid There is also a desire from operators to use DOCSIS systems for mobile backhaul which puts high requirements on network synchronization currently not met by the current DOCSIS technology. In summary, improving capacity for DOCSIS based networks is costly.

SUMMARY

One objective is to provide an efficient and cost-effective solution to data transfer over a wired connection.

According to a first aspect, it is provided a communication device comprising: a first wired connection interface for communicating backhaul signals with more central equipment over a wired connection; a mobile termination device configured to transmit and receive the backhaul signals, wherein the backhaul signals conform to a cellular mobile communication standard; a radio base station, connected to the mobile termination device, wherein the radio base station is configured to transmit and receive access signals, conforming to a cellular mobile communication standard, to and from at least one local device, the access signals containing same payload data as corresponding backhaul signals; and at least one antenna port for communicating the access signals over the air.

The communication device may further comprise: at least one local area network, LAN, port for providing access to at least one local device.

The communication device may further comprise: an access point for providing wireless LAN access to at least one local device.

The communication device may further comprise: at least one backhaul antenna port for communicating complementary backhaul signals over the air.

The communication device may further comprise a first frequency converter provided between the mobile termination device and the first wired connection interface, wherein the first frequency converter is configured to convert between radio frequency, RF, for the mobile termination device and intermediate frequency, IF, for the first wired connection interface.

The backhaul signals may comprise signal components respectively conforming to at least two different cellular mobile communication standards.

The cellular mobile communication standard of the backhaul signals may be the same as the cellular mobile communication standard of the access signals.

The access signals may be of a different configuration than the backhaul signals, with regard to at least one of cellular mobile communication standard, frequency band, spatial layers, and beamforming.

The communication device may be configured to convert between several smaller LTE, Long Term Evolution, carriers in the backhaul signals and a single NR, New Radio, carrier in the access signals, or vice versa.

The communication device may be configured to convert between several cellular communication standards in the backhaul signals and a single cellular communication standard in the access signals, or vice versa.

The communication device may be configured to convert between a single spatial layer in the backhaul signals and multiple spatial layers in the access signals.

The communication device may further comprise a second wired connection interface for communicating fronthaul signals with more distal equipment over wired connection, and a second frequency converter provided between the radio base station and the second wired connection interface, wherein the second frequency converter is configured to convert between radio frequency, RF, for the radio base station and intermediate frequency, IF, for the second wired connection interface.

According to a second aspect, it is provided a method, performed in a communication device comprising a wired connection interface, a mobile termination device, a radio base station, and at least one antenna port. The method comprises the steps of: communicating, over the wired connection interface, backhaul signals with more central equipment, wherein the backhaul signals conform to a cellular mobile communication standard; and communicating, using the radio base station, access signals conforming to a cellular mobile communication standard, with at least one local device, wherein the access signals contain same payload data as corresponding backhaul signals, the access signals being communicated over the air using the at least one antenna port.

The step of communicating access signals may comprise providing access to at least one local device using at least one local area network, LAN, port.

The step of communicating access signals may comprise providing wireless LAN access to at least one local device using an access point.

The step of communicating backhaul signals may comprise: communicating complementary backhaul signals over the air using at least one backhaul antenna port.

The step of communicating backhaul signals may comprise converting between radio frequency, RF, for the mobile termination device and intermediate frequency, IF, for the first wired connection interface using a first frequency converter provided between the mobile termination device and the first wired connection interface.

The backhaul signals may comprise signal components respectively conforming to at least two different cellular mobile communication standards.

The cellular mobile communication standard of the backhaul signals may be the same as the cellular mobile communication standard of the access signals.

The access signals may be of a different configuration than the backhaul signals, with regard to at least one of cellular mobile communication standard, frequency band, spatial layers, and beamforming.

The method may further comprise the step of: converting between backhaul signals and access signals.

The step of converting may comprise converting between several smaller LTE, Long Term Evolution, carriers in the backhaul signals and a single NR, New Radio, carrier in the access signals, or vice versa.

The step of converting may comprise converting between several cellular communication standards in the backhaul signals and a single cellular communication standard in the access signals, or vice versa.

The step of converting may comprise converting between a single spatial layer in the backhaul signals and multiple spatial layers in the access signals.

According to a third aspect, it is provided a computer program comprising computer program code. The computer program code, when run on a communication device, comprising a wired connection interface, a mobile termination device, a radio base station, and at least one antenna port, causes the communication device to: communicate, over the wired connection interface, backhaul signals with more central equipment, wherein the backhaul signals conform to a cellular mobile communication standard; and communicate, using the radio base station, access signals conforming to a cellular mobile communication standard, with at least one local device, wherein the access signals contain same payload data as corresponding backhaul signals, the access signals being communicated over the air using the at least one antenna port.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
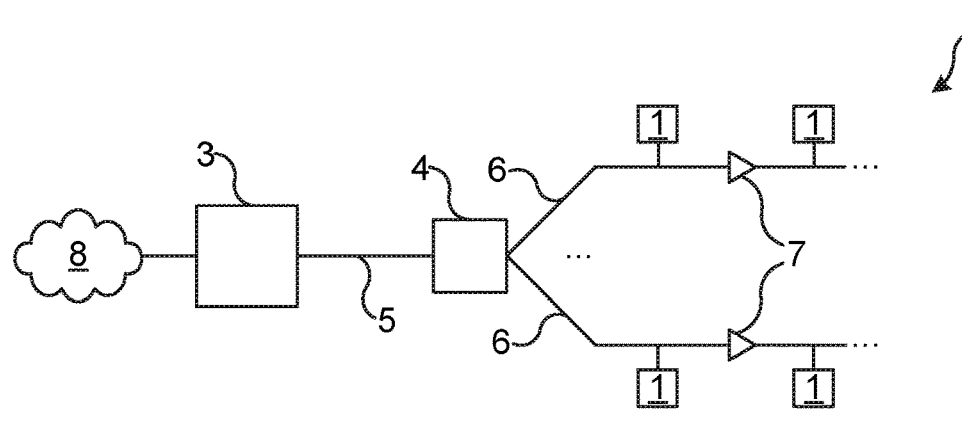
FIG. 1 is a schematic diagram illustrating an environment in which embodiments presented herein can be applied.

FIG. 1 is a schematic diagram illustrating an environment in which embodiments presented herein can be applied, in this case as a hybrid fibre-coax (HFC) network 9. A headend 3 is provided which can be connected to external networks 8, such as the Internet and/or core network(s). The headend 3 is connected to one or more hubs 4 over optical fibre 5. From each hub 4, wired connections in the form of coaxial cables 6 are provided to communication devices 1 at premises, such as homes and offices. Amplifiers or relay nodes 7 can be provided to improve the signal quality for communication devices 1 far away from the hub 4.

According to embodiments presented herein, instead of using a DOCSIS headend (based on CMTS, cable modem termination system), the headend 3 communicates with the communication devices in backhaul signals based on one or more cellular mobile communication standards. The headend 3 then comprises a radio base station, e.g. a gNB (g Node B) or eNB (e Node B) which is capable of communicating the backhaul signals over fibre. Eventually, the backhaul signals are also carried over cable in the HFC network.

Optionally, the functionality of the radio base station is split over several nodes. For instance, the headend 3 could contain higher layers of the radio base station, implementing a central unit. The hub 4 would then contain lower layers of the radio base station and the cable interface, implementing a remote unit. In such an embodiment, there could be multiple hubs 4 connected to each headend 3. Optionally, one or more hubs 4 comprise radio antennas for over the air communication for complementary backhaul signals. The interface over fibre 5 between the central unit and the remote unit could be implemented using any one or more of: an F1 interface (PDCP Packet Data Convergence Protocol)/RLC (Radio Link Control) split), a fronthaul link where a lower layer split is transported over e.g. CPRI/eCPRI (Common Public Radio Interface/evolved CPRI), or IF/RF over fibre.

In any case, the headend 3 uses one or more cellular mobile communication standards for communicating the backhaul signals with the communication devices 1 over the HFC network 9. The different cellular communication standards are also called different Radio Access Technologies (RATs) herein, even though the backhaul signals are communicated over wired connection and not over the air. The cellular mobile communication standard may e.g. comply with any one or a combination of 5G NR (New Radio), LTE (Long Term Evolution), LTE Advanced, W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, as long as the principles described hereinafter are applicable. The headend can be implemented as an IAB (integrated access and backhaul) donor, but over wired connection.

When applied in pure radio, IAB provides a structure where a gNB provides access to UEs (instances of User Equipment), as well as wireless backhaul to other IAB nodes. The node at the root of the tree is called IAB donor and connects to the core network. This gNB can either be a consolidated gNB or split into distributed nodes. Each IAB node (except the IAB donor) contains a mobile termination device to communicate with the uplink gNB.

In terms of frequency, the backhaul signals between the headend 3 and the communication devices 1 can be placed on their actual radio frequency (RF) in accordance with the RAT or mixed to an intermediate frequency (IF).

It is to be noted that while FIG. 1 discloses an HFC network, embodiments presented herein can also be applied in other types of networks, as long as the communication device 1 is connected via wired connection.

Figure 2A:
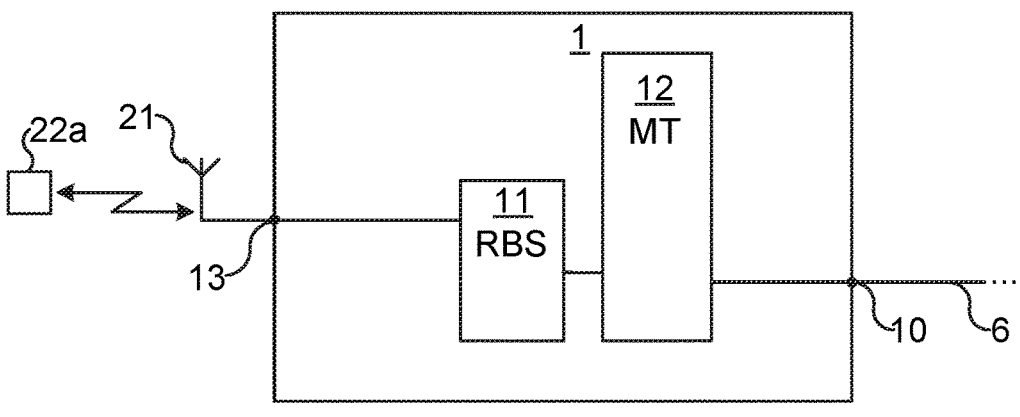
FIGS. 2A and 2B are schematic diagrams illustrating embodiments of the communication device of FIG. 1 according to two embodiments.
Figure 2B:
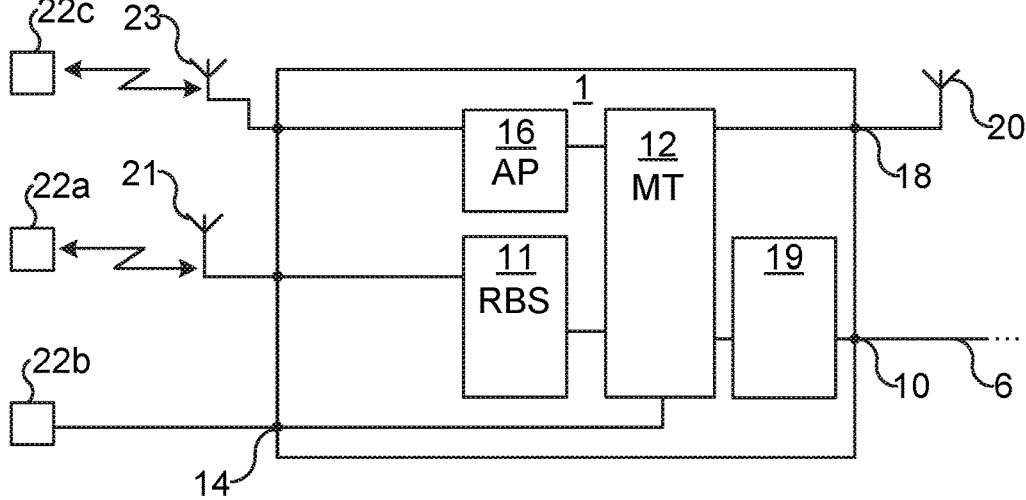

FIGS. 2A and 2B are schematic diagrams illustrating embodiments of the communication device 1 of FIG. 1 according to two embodiments. First, the embodiment illustrated in FIG. 2A will be described. The communication device 1 can be a form of CPE (Customer Premises Equipment), providing data access to one or more local devices 22a. The one or more local devices can e.g. be a mobile phone, smart phone, a tablet computer and/or a laptop/ desktop computer or, when the communication device is used as a relay, another communication device.

The communication device 1 comprises a first wired connection interface 10 for communicating backhaul signals with more central equipment (see e.g. the hub 4 and the headend 3 of FIG. 1) over a wired connection 6. The wired connection 6 can be a coaxial cable of an HFC network or of a Distributed Antenna System (DAS). It is to be noted that the coaxial cable connecting to the communication device 1 may (but does not need to) form part of the network on the premises, i.e. an in house coaxial cable. Alternatively, the wired connection can be in the form of an optical fibre such as in a point-to-multipoint connection.

A mobile termination device 12 is configured to transmit and receive the backhaul signals. The backhaul signals conform to a cellular mobile communication standard, i.e. a RAT. The mobile termination device 12 can contain a subset of functionality of a conventional UE (user equipment). For instance, the mobile termination device 12 does not need an antenna, which forms part of a conventional UE, since the mobile termination device 12 communicates over the wired connection medium. Moreover, since the mobile termination device 12 typically is not a device which often changes location, functionality related to mobility is not required in the mobile termination device 12. Moreover, the mobile termination device 12 might not need all protocol layers. For instance, there may be no need for a PDCP (layer for user plane data.

A radio base station 11 is provided and is connected to the mobile termination device 12. The radio base station 11 is configured to transmit and receive access signals. It is to be noted that the radio base station 11 does not need to provide access for a large area; it is sufficient that the premises of the communication device 1 are covered. Moreover, all functionality of a complete radio base station might not be needed. For instance, the radio base station of the communication device can be limited in support, e.g. supporting only L1 (level 1) or L1 and L2 (Level 2) communication. Alternatively, the radio base station 11 supports full radio base station functionality. The access signals conform to a cellular mobile communication standard, and the access signals are communicated with at least one local device 22a. One or more antenna ports 13 and connected respective antennas 21, are provided for communicating (transmitting and receiving) the access signals over the air.

The access signals contain the same payload data as corresponding backhaul signals. In other words, payload data originating from the local device pass through the communication device 1 and is transmitted on the wired connection 6. Analogously, payload data received on the wired connection 6 pass through the communication device 1 and is transmitted to the at least one local device 22a.

In this way, great flexibility is provided in the configuration of the backhaul signals and the access signals, even though these signals both conform to, on their own, to some type of cellular mobile communication standard. Hence, the backhaul signals can be of any type suitable for communication over wired connection, and the fronthaul signals can be of any type suitable for communication over the air.

For instance, the backhaul signals can comprise signal components respectively conforming to at least two different cellular mobile communication standards, i.e. conforming to a mix of cellular mobile communication standards (i.e. different RATs).

Optionally, as shown in FIG. 2B, the communication device 1 comprises a first frequency converter 19 provided between the mobile termination device 12 and the first wired connection interface. The first frequency converter 19 is configured to convert between radio frequency (RF) for the mobile termination device 12 and intermediate frequency (IF) for the first wired connection interface 10. The backhaul signals over the wired connection are then communicated in IF, which is often (but not necessarily) lower in frequency than RF. In any case, IF is in a different frequency band than RF and there is more freedom in where in the frequency spectrum that the IF signals are placed. In this way, requirements on the wired connection 6 to support RF frequencies are removed, and it is sufficient that IF signals are supported. Moreover, the use of IF implies that more than one layer per RF frequency band can be supported. Optionally, more than one frequency converter can be provided. For instance, the mobile terminal device might expect multiple layers to be one the same frequency while the wired connection only supports one layer for a given frequency.

In one embodiment, the cellular mobile communication standard of the backhaul signals is the same as the cellular mobile communication standard of the access signals. This simplifies implementation of the communication device 1.

In one embodiment, the access signals are of a different configuration than the backhaul signals, with regard to at least one of cellular mobile communication standard, frequency band, spatial layers, and beamforming.

For instance, the communication device 1 can be configured to convert between several smaller LTE (Long Term Evolution) carriers in the backhaul signals and a single NR (New Radio) carrier in the access signals.

In one embodiment, the communication device 1 is configured to convert between several cellular communication standards (RATs) in the backhaul signals and a single cellular communication standard (RAT) in the access signals, or vice versa.

In one embodiment, the communication device 1 is configured to convert between a single spatial layer in the backhaul signals and multiple spatial layers in the access signals. In this way, multiple spatial layers, which are not supported on the same frequency band over wired connection, can be exploited for the air interface to the at least one local device 22*a*. Having a single (or a few) wide carriers for the backhaul signals on the wired connection reduces complexity since fewer frequency converters etc. are needed in conversion between RF and IF. Also, the architecture using embodiments presented herein decouples the wired connection interface from the RF interface, allowing a single wired connection interface to be used for many different configurations of RF carrier width and number of layers.

Optionally, different spatial layers can be provided in different frequency bands in the backhaul signals. The access signals can e.g. be transmitted using SU-MIMO (Single User—Multiple Input Multiple Output) or MU-MIMO (Multiple User—MIMO).

Optionally, the communication device 1 is powered over the wired connection using either DC (Direct Current) or AC (Alternating Current).

Looking now to FIG. 2B, there are a number of additional, optional components, compared to the embodiment of FIG. 2A. Components which were described for FIG. 2A and are the same in FIG. 2B will not be described again.

The communication device 1 here comprises at least one LAN (local area network port 14 for providing access to at least one local device 22*b*, e.g. using Ethernet.

Alternatively or additionally, the communication device 1 comprises an access point 16 for providing wireless LAN (WLAN) access to at least one local device 22C, e.g. using any one or more of the IEEE 802.11x standards. Alternatively or additionally, the access point 16 provides access using any one or more of Bluetooth, ZigBee, NB-IOT (Narrowband IoT), LPWAN (Low-Power Wide-Area Network), such as LoRa (Long Range).

It is to be noted that each local device 22*a-c* can support communication using any one or more of the (cellular based) access signals, the WLAN signals and the LAN signal.

The communication device 1 optionally comprises at least one backhaul antenna port 18 for communicating complementary backhaul signals over the air using a backhaul antenna 20. This can increase capacity or redundancy to the communication over the wired connection 6. The complementary backhaul signals can be for the same core network to which the headend is connected, optionally via separate radio base stations. Alternatively, the complementary backhaul signals are for a core network which is not used for the headend. Alternatively or additionally, the over the air backhaul connection can be used to synchronize with RIBS (Radio-interface base-station sync) in accordance with 3GPP TR 36.898, or to position the communication device 1.

Using the separation of communication of backhaul signals and access signals, great flexibility is provided for both of these types of signals. This can be exploited to customize communication according to what is most appropriate for each one of the backhaul signals and the access signals.

Moreover, the provided solution is flexible to use efficient technologies on the backhaul to increase capacity and reduce latency compared to DOCSIS.

Figure 2C:
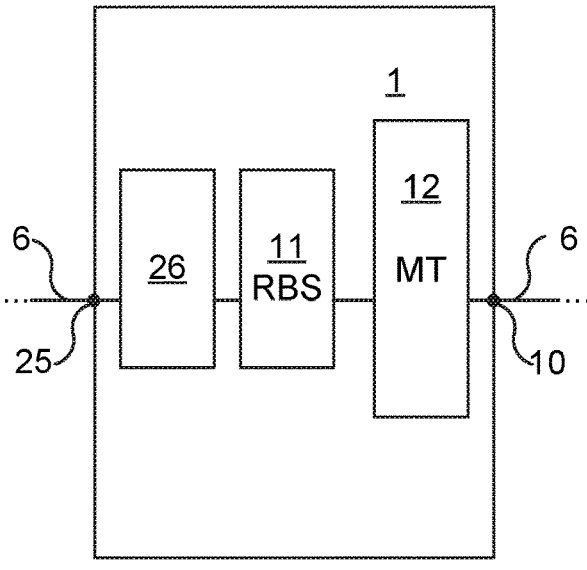

Looking now to FIG. 2C, the communication device 1 is provided which functions as a relay device.

The communication device 1 here comprises a second wired connection interface 25 for communicating fronthaul signals with more distal equipment over wired connection 6. A second frequency converter 26 is optionally provided between the radio base station 11 and the second wired connection interface 25. When provided, the second frequency converter 26 is configured to convert between RF for the radio base station 11 and IF for the second wired connection interface 25. In this embodiment, there does not need to be any antenna port or antenna.

With this embodiment, the communication device 1, functioning as a relay, can replace the amplifiers 7 in FIG. 1 to improve capacity and flexibility. Furthermore, this relay provides all the flexibility described above for conversion on the two sides of the communication device. Optionally, this relay is powered over the wired connection using either DC or AC, to provide more flexibility in where the relay device is provisioned.

Figure 3A:
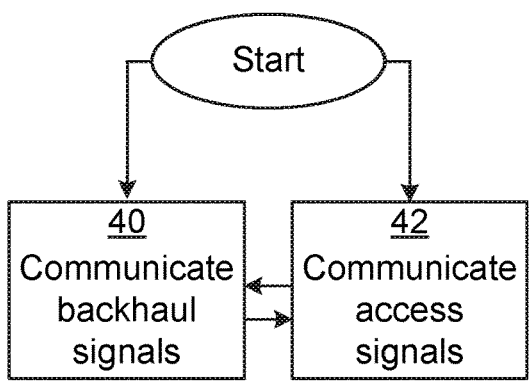
FIGS. 3A-B are flow charts illustrating embodiments of methods performed in the communication device of FIG. 1 and FIGS. 2A-2C.
Figure 3B:
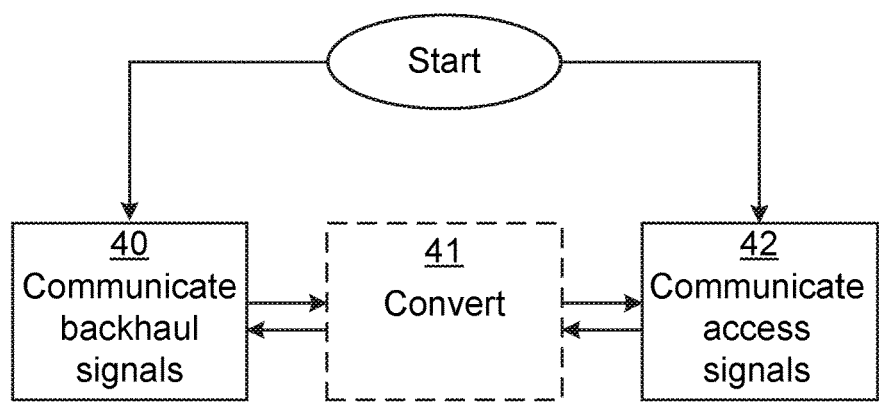

FIGS. 3A-B are flow charts illustrating embodiments of methods performed in the communication device of FIG. 1 and FIGS. 2A-2C. As explained above, the communication device comprises a wired connection interface, a mobile termination device, a radio base station, and at least one antenna port.

In a communicate backhaul signals step 40, the communication device communicates, over the wired connection interface, backhaul signals with more central equipment as described above. The backhaul signals conform to a cellular mobile communication standard.

Optionally, complementary backhaul signals are communicated over the air using at least one backhaul antenna port.

Optionally, this step comprises converting between RF for the mobile termination device and IF for the first wired connection interface. This is then performed in a first frequency converter provided between the mobile termination device and the first wired connection interface.

The backhaul signals can be of any type suitable for communication over wired connection. For instance, the backhaul signals can comprise signal components respectively conforming to at least two different cellular mobile communication standards.

In a communicate access signals step 42, the communication device communicates, using the radio base station, access signals conforming to a cellular mobile communication standard, with at least one local device. The access signals contain same payload data as corresponding backhaul signals. The access signals are communicated over the air using the at least one antenna port.

Optionally, the communication device provides access to at least one local device using at least one LAN port and/or provides WLAN access to at least one local device using an access point.

The format for the access signals can be chosen freely and do not directly depend on the format of the backhaul signals. Nevertheless, the cellular mobile communication standard of the backhaul signals can be the same as the cellular mobile communication standard of the access signals to simplify the implementation.

The access signals can also be of a different configuration than the backhaul signals, with regard to at least one of cellular mobile communication standard, frequency band, spatial layers, and beamforming.

Looking now to FIG. 3B, only new or modified steps, compared to those of FIG. 3A will be described.

In an optional convert step 41, the communication device converts between backhaul signals and access signals. This conversion occurs in both directions.

This conversion can comprise converting between several smaller LTE carriers in the backhaul signals and a single NR carrier in the access signals.

In one embodiment, the conversion comprises converting between several cellular communication standards in the backhaul signals and a single cellular communication standard in the access signals, or vice versa.

Optionally, the conversion comprises converting between a single spatial layer in the backhaul signals and multiple spatial layers in the access signals.

Figure 4:
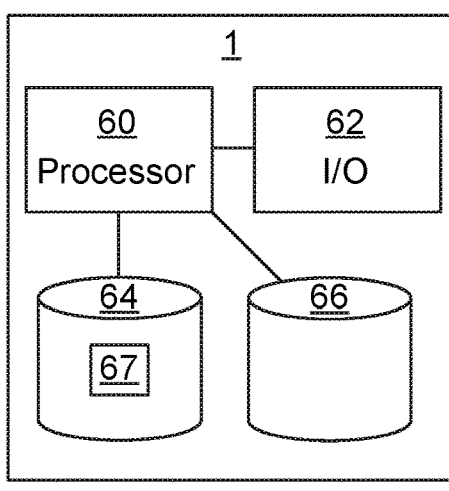
FIG. 4 is a schematic diagram illustrating components of the communication device of FIGS. 1 and FIGS. 2A-C according to one embodiment.

FIG. 4 is a schematic diagram illustrating components of the communication device 1 of FIG. 1 and FIGS. 2A-C according to one embodiment. It is to be noted that one or more of the mentioned components can be provided in multiple instances in each one of different units (e.g. the radio base station 11 and the mobile termination device 12) of the communication device 1. A processor 60 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 3A-3B above.

The memory 64 can be any combination of random access memory (RAM) and/or read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The communication device 1 further comprises an I/O interface 62 for communicating with external and/or internal entities. Optionally, the I/O interface 62 also includes a user interface.

Figure 5:
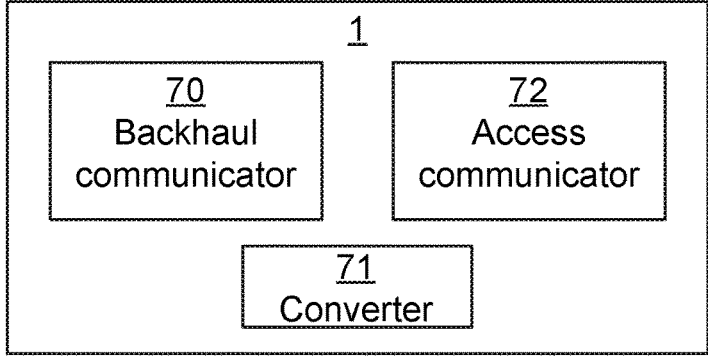
FIG. 5 is a schematic diagram showing functional modules of the communication device of FIG. 4 according to one embodiment.

FIG. 5 is a schematic diagram showing functional modules of the communication device 1 of FIG. 4 according to one embodiment. The modules are implemented using software instructions such as a computer program executing in the communication device 1. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 3A and 3B.

A backhaul communicator corresponds to step 40. A converter 71 corresponds to step 41. An access communicator 72 corresponds to step 42.

Figure 6:
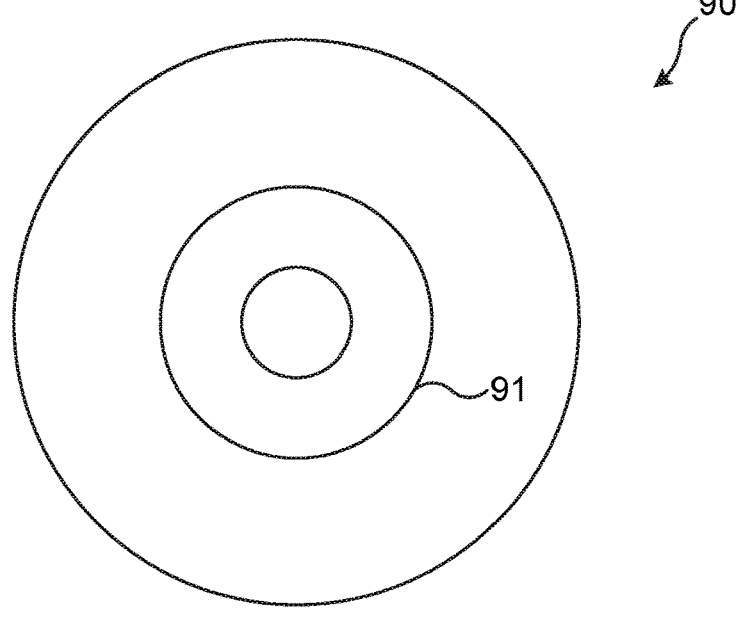
FIG. 6 shows one example of a computer program product comprising computer readable means.

FIG. 6 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A communication device comprising:
a first wired connection interface for communicating backhaul signals with more central equipment over a wired connection;
a mobile termination device configured to transmit and receive the backhaul signals, wherein the backhaul signals conform to a Radio Access Technology, RAT, of a cellular mobile communication standard and wherein the backhaul signals are placed on an actual Radio Frequency, RF, in accordance with the RAT or mixed to an Intermediate Frequency, IF;
a radio base station, connected to the mobile termination device, wherein the radio base station is configured to transmit and receive access signals, conforming to a cellular mobile communication standard, to and from at least one local device, the access signals containing same payload data as corresponding backhaul signals; and
at least one antenna port for communicating the access signals over the air.

2. The communication device according to claim 1, further comprising:
at least one backhaul antenna port for communicating complementary backhaul signals over the air.

3. The communication device according to claim 1, further comprising a first frequency converter provided between the mobile termination device and the first wired connection interface, wherein the first frequency converter is configured to convert between radio frequency, RF, for the mobile termination device and intermediate frequency, IF, for the first wired connection interface.

4. The communication device according to claim 1, wherein the backhaul signals comprise signal components respectively conforming to at least two different cellular mobile communication standards.

5. The communication device according to claim 1, wherein the cellular mobile communication standard of the backhaul signals is the same as the cellular mobile communication standard of the access signals.

6. The communication device according to claim 1, wherein the access signals are of a different configuration than the backhaul signals, with regard to at least one of cellular mobile communication standard, frequency band, spatial layers, and beamforming.

7. The communication device according to claim 1, wherein the communication device is configured to convert between several smaller LTE, Long Term Evolution, carriers in the backhaul signals and a single NR, New Radio, carrier in the access signals, or vice versa.

8. The communication device-according to claim 1, wherein the communication device is configured to convert between several cellular communication standards in the backhaul signals and a single cellular communication standard in the access signals, or vice versa.

9. The communication device according to claim 1, wherein the communication device is configured to convert between a single spatial layer in the backhaul signals and multiple spatial layers in the access signals.

10. A method, performed in a communication device comprising a wired connection interface, a mobile termination device, a radio base station, and at least one antenna port, the method comprising the steps of:

communicating, over the wired connection interface, backhaul signals with more central equipment, wherein the backhaul signals conform to a Radio Access Technology, RAT, of a cellular mobile communication standard and wherein the backhaul signals are placed on an actual Radio Frequency, RF, in accordance with the RAT or mixed to an Intermediate Frequency, IF; and communicating, using the radio base station, access signals conforming to a cellular mobile communication standard, with at least one local device, wherein the access signals contain same payload data as corresponding backhaul signals, the access signals being communicated over the air using the at least one antenna port.

11. The method according to claim 10, wherein the step of communicating backhaul signals comprises: communicating complementary backhaul signals over the air using at least one backhaul antenna port.

12. The method according to claim 10, wherein the step of communicating backhaul signals comprises converting between radio frequency, RF, for the mobile termination device and intermediate frequency, IF, for the first wired connection interface using a first frequency converter provided between the mobile termination device and the first wired connection interface.

13. The method according to claim 10, wherein the backhaul signals comprise signal components respectively conforming to at least two different cellular mobile communication standards.

14. The method according to claim 10, wherein the cellular mobile communication standard of the backhaul signals is the same as the cellular mobile communication standard of the access signals.

15. The method according to claim 10, wherein the access signals are of a different configuration than the backhaul signals, with regard to at least one of cellular mobile communication standard, frequency band, spatial layers, and beamforming.

16. The method according to claim 10, further comprising the step of:

converting between backhaul signals and access signals.

17. The method according to claim 16, wherein the step of converting comprises converting between several smaller LTE, Long Term Evolution, carriers in the backhaul signals and a single NR, New Radio, carrier in the access signals, or vice versa.

18. The method according to claim 16, wherein the step of converting comprises converting between several cellular communication standards in the backhaul signals and a single cellular communication standard in the access signals, or vice versa.

19. The method according to claim 16, wherein the step of converting comprises converting between a single spatial layer in the backhaul signals and multiple spatial layers in the access signals.

20. A computer program comprising computer program code which, when run on a communication device, comprising a wired connection interface-, a mobile termination device, a radio base station, and at least one antenna port, causes the communication device to:

communicate, over the wired connection interface, backhaul signals with more central equipment, wherein the backhaul signals conform to a Radio Access Technology, RAT, of a cellular mobile communication standard and wherein the backhaul signals are placed on an actual Radio Frequency, RF, in accordance with the RAT or mixed to an Intermediate Frequency, IF; and communicate, using the radio base station, access signals conforming to a cellular mobile communication standard, with at least one local device, wherein the access signals contain same payload data as corresponding backhaul signals, the access signals being communicated over the air using the at least one antenna port.

* * * * *